Oct. 20, 1925.  M. E. ROGERS  1,557,881
BALE
Filed Sept. 10, 1924
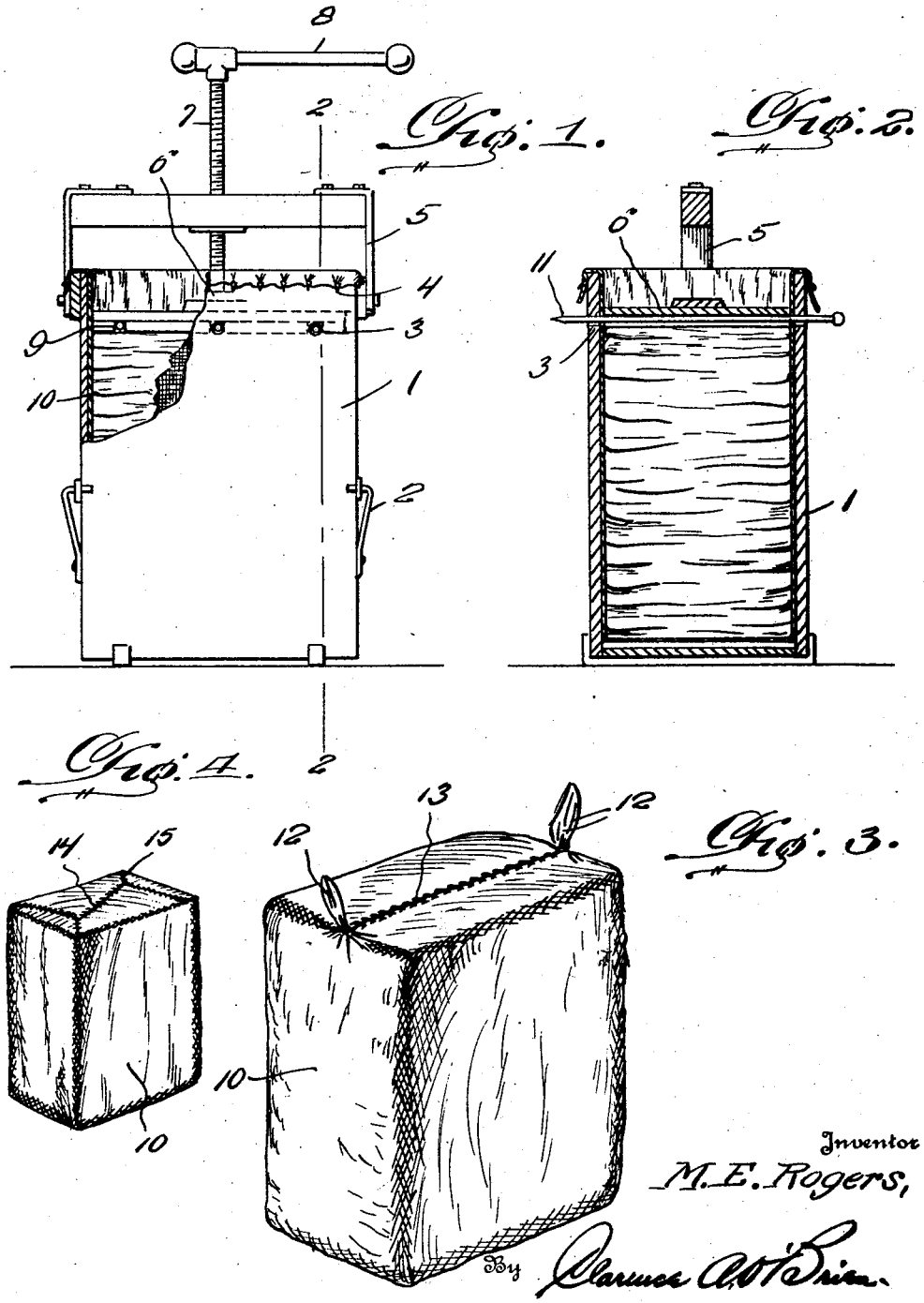

Patented Oct. 20, 1925.

1,557,881

UNITED STATES PATENT OFFICE.

MORRIS E. ROGERS, OF NORWOOD, LOUISIANA.

BALE.

Application filed September 10, 1924. Serial No. 736,928.

*To all whom it may concern:*

Be it known that I, MORRIS E. ROGERS, a citizen of the United States, residing at Norwood, in the parish of East Feliciana and State of Louisiana, have invented certain new and useful Improvements in Bales, of which the following is a specification.

This invention relates to a bale, and it consists in the novel features hereinafter described and claimed.

An object of the invention is to provide a bale which is exceedingly simple in its construction, one which will be strong, durable, and well adapted to the purpose for which it is designed.

In the accompanying drawing:

Figure 1 is a side elevational view of the baling chamber with parts thereof broken away, and parts shown in section.

Figure 2 is a transverse sectional view of the baling chamber, cut on the line 2—2 of Figure 1.

Figure 3 is a perspective view of one form of the bag of baled material, which is formed in the baling chamber.

Figure 4 is a similar view of another form of the bale.

The baling chamber includes opposite side walls 1, which are secured through the end walls thereof by means of hooks 2 in a usual manner. The side walls 1 are provided in the vicinity of their upper edges with oppositely disposed openings 3. The side and end walls of the baling chamber are provided in the vicinity of their upper edges and at their outer sides with hooks 4. A yoke 5 is pivotally connected with the baling chamber in a usual manner, and a plunger 6 is connected by means of a screw 7 with the intermediate portion of the yoke 5. A handle bar 8 is carried at the upper end of the screw 7 and may be used for rotating the same in a usual manner. The plunger 6 is provided at its under face with grooves 9 which are adapted to register with the openings 3, in the side walls of the baling chamber.

In operation, the plunger is elevated above the upper edges of the baling chamber and may be swung to one side by swinging the yoke 5 upon its pivotal connection with a baling chamber. The body of a bag 10 is then inserted in the baling chamber between the side walls thereof, and the edge portions of the bag 10 are carried over the upper edges of the walls of the baling chamber, and are engaged with the hooks 4. The material to be baled is then filled into the bag, and the plungers swung back over the upper end of the baling chamber, and by rotating the screw 7 with the use of the handle bar 8, the said plunger is caused to descend within the baling chamber and compress the material in the chamber and between the side walls of the bag.

This operation is continued, until the bag is filled with the material to be baled. When the bag is sufficiently filled with the material, the plunger is moved into the baling chamber until the grooves 9 are brought into register with the openings 3 in the side walls of the baling chamber. Pointed pins 11 are then passed transversely thru the openings and the side walls of the baling chamber and through the upper portion of the bag and through the grooves 9.

The plunger 6 is then lifted above the upper edges of the baling chamber, and the edge portions of the bag 10 are disengaged from the hook 4, and the opposite edges of the bag are drawn together above the upper surface of the bale and are secured together by means of a lacing 13. The end portions of the bag are gathered, as at 12, thereby forming handles at the sides of the bales. The pins 11 are then withdrawn from the openings 3 in the side walls of the baling chamber and the side walls 1 are disconnected from the other walls of the baling chamber, when the bale may be lifted out of the baling chamber by using the handle 12. The bale and the bag will be substantially in the form of a cube, having flat sides, top and bottom, and consequently the said bag and bale may rest in an upright position, and the bags may be regularly and evenly piled one upon another.

In the form of the bale as illustrated in Figure 4 of the drawing, the same is of general cubical shape, and having the bag 10 disposed around the sides of the body of the material, and in close contact therewith. The edges of the bag are folded over the top side of the body of the bale, and the side edges of the bag are secured together by a lacing 14 which is disposed approximately diagonally with relation to the top side of the body of the bale. The intervening side portions of the bag are secured to the first mentioned side portions of the bag by angular lacing seams 15. The apices of the seams 15 join with the ends of the seam 14, and whereby the end portions of the seams 15 approximately bisect the angles at the corners of the bale. Thus, the said seams materially strengthen the structure of the top side of the bale covering and the said seams and the portions thereof are so disposed with relation to the bale and with relation to each other as to keep the sides of the bag properly stretched and in a taut condition around the sides of the body of the bale.

Having thus described the invention, what is claimed is:

A bale comprising a substantially cubical body, a bag encasing the body, and having its head portion folded over the top side thereof, two of the opposite side edge portions of the bag being secured together by a lacing seam which is disposed approximately diagonally with relation to the top side of the body, and the intervening side edge portions of the bag being connected with the first mentioned side edge portions of the bag by angular lacing seams, the apices of the angles of the last mentioned lacing seams joining with the ends of the first mentioned lacing seams, and the end portions of the angular lacing seams approximately bisecting the corner angles at the top side of the body.

In testimony whereof I affix my signature.

MORRIS E. ROGERS.